Jan. 30, 1945.   K. K. PALUEV   2,368,506
ELECTRIC APPARATUS AND WINDING THEREFOR
Filed May 5, 1942
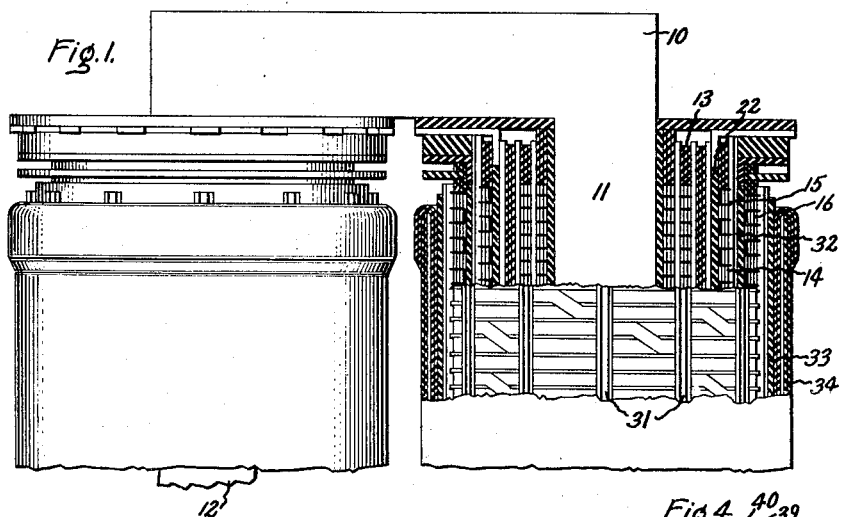
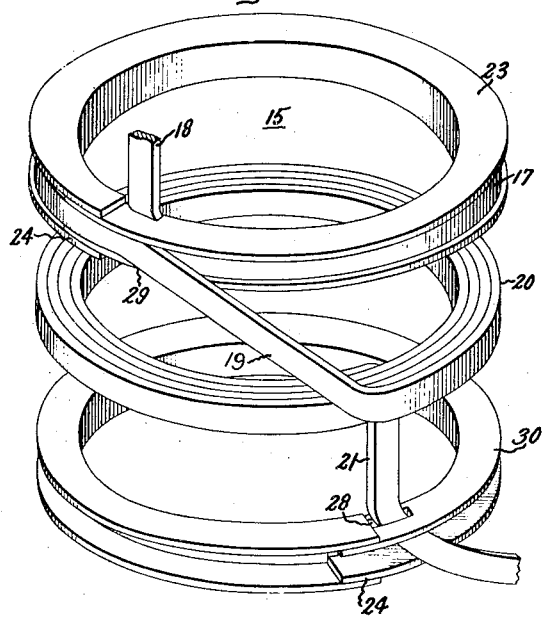
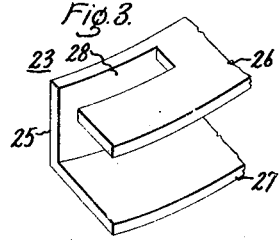
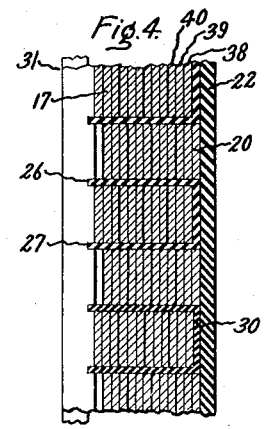
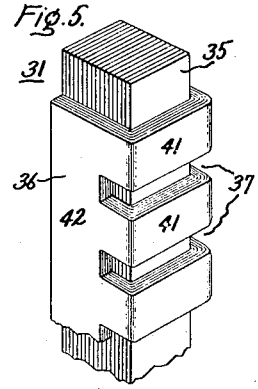
Inventor:
Konstantin K. Paluev,
by Harry E. Dunham
His Attorney.

Patented Jan. 30, 1945

2,368,506

UNITED STATES PATENT OFFICE 2,368,506

ELECTRIC APPARATUS AND WINDING THEREFOR

Konstantin K. Paluev, Pittsfield, Mass., assignor to General Electric Company, a corporation of New York Application May 5, 1942, Serial No. 441,782

5 Claims. (Cl. 175—362)

My invention relates to electric apparatus and a winding therefor, and although not limited thereto it has application to multiconcentric continuous disk coil windings for transformers with an improved spacer arrangement between the concentric windings.

An object of my invention is to provide an improved and efficient winding for an electrical apparatus.

Another object of my invention is to provide an improved continuous disk coil winding for a transformer.

A further object of my invention is to provide an electrical apparatus with an improved and efficient multiconcentric winding structure.

A still further object of my invention is to provide an improved spacer arrangement which may be placed between windings of an electrical apparatus.

Further objects and advantages of my invention will become apparent from the following description referring to the accompanying drawing, and the features of novelty which characterize my invention will be pointed out with particularity in the claims annexed to and forming a part of this specification.

In the drawing, Fig. 1 is a side elevation in partial section of the winding structure of an electrical apparatus, such as a transformer which is provided with an embodiment of my invention; Fig. 2 is an exploded perspective view of three disk coils of the transformer structure illustrated in Fig. 1; Fig. 3 is a perspective view in a portion of a channel collar which is employed in the winding structure illustrated in Figs. 1 and 2; Fig. 4 is a sectional side elevation of a portion of one of the windings illustrated in Fig. 1, and Fig. 5 is a perspective view of a portion of the spacer employed between concentric windings of the transformer structure illustrated in Fig. 1.

In the structure illustrated in the drawing, I have shown an improved arrangement for insulating coil disks of a continuous disk coil winding and an improved arrangement for spacing concentric windings of a transformer. However, it is to be understood that my invention has application to any other suitable electric apparatus having windings with portions or turns which are to be insulated from each other. The windings illustrated include a plurality of axially disposed disk coils, each of the coils including a plurality of concentric turns. The disk coils are continuous, one disk being wound from the inside out and the adjacent being wound from the outside in. This latter arrangement is accomplished by the conventional method of first winding a coil from the inside out and then reshuffling the turns so that starting with the outside turn which is connected to the intercoil conductor connector, the turns progressing inwardly. Each of the coils in my impoved structure which is wound from the inside out and maintained that way is wound in a channel collar of any suitable type. In order to provide an arrangement for receiving the intercoil connection between the inner turns of one coil which is within the channel and the inner turn of the next coil which is between two channels, I provide slits in a suitable portion of the channels to accommodate the interturn coil connectors.

When multiconcentric windings are employed with a fluid passageway between the concentric windings, I provide an improved spaced arrangement for maintaining the windings in spaced relationship. The spacers which include grooves to receive edges of the collars are provided with a particular grain structure in relation to the grooves in order that the possibility of shavings or pieces from the surface of the groove being removed so as to contaminate the fluid dielectric will be minimized.

Referring more particularly to Fig. 1 of the drawing, I have illustrated a portion of a transformer having a core 10 and winding legs 11 and 12. Winding structures which surround the legs 11 and 12 include a low voltage winding 13 which may be of any suitable construction and a high voltage winding structure 14. The high voltage winding construction includes a pair of concentric continuous disk windings 15 and 16. Although two windings are shown it is to be understood that my invention may have application to one winding or to any suitable number of windings. Each of the windings 15 and 16 includes a plurality of axially disposed coils, each of the coils including a plurality of concentric turns, as will be illustrated more clearly in the exploded perspective view of Fig. 2. The winding includes a disk coil 17 which is wound from the inside out, starting with an end portion 18 and winding a suitable number of concentric turns such as four and ending with the end portion 19. An adjacent disk coil 20 is composed of any suitable number of turns such as a similar number as that making up the coil 17, the coil ending with an interturn connector 21. The coils 17 and 20 may be composed of separate conductors which may be attached together at some place in the interturn coil connection, or as illustrated in Fig. 2, the several coils may be formed of one continuous conductor. With such a construction, the coils may be wound on any suitable insulating member, such as a cylinder 22, the coil 17 being wound from the inside out and the coil 20 being also wound from the inside out and then reshuffled so that the coil will progress inwardly from the interturn connector 19, the inner turn being connected to the interturn connector 21.

In order to provide an improved arrangement for insulating the disk coils such as the adjacent coils 17 and 20 in an efficient manner and for providing a long creepage path therebetween, I wind each of the coils which are wound from the inside out and remain in that condition, in a channel collar 23 of any suitable type. The channel collar 23 may be of any suitable size such as being sufficient to surround the cylinder 22 and overlap a small portion, as is illustrated at 24. The channel collar includes an axially extending portion 25, as will be seen more clearly in Fig. 3, and a pair of radially extending portions 26 and 27. The channel collar may be formed in any suitable manner such as by molding the collar of suitable cellulosic material such as pressboard into the desired shape. In order to provide a suitable arrangement for accommodating the lead portion 18, a portion of the radially extending portion 26 is cut out at 28 so as to provide a groove or cutout portion or slit through which the lead 18 may pass. The radial dimension of the portions 26 and 27 may have such length that as the place is reached where the interturn connector 19 must pass out of the channel 23, the coil is of such thickness that it may pass over the top edge of the portion 26 that no slit need be necessary at that point. However, as will be seen in Fig. 4, the radial dimensions of th portions 26 and 27 are greater than the thickness of the coil, so that those portions may fit into cooperating grooves in the spacers. Thus the portion 26 is provided with a slit 29 through which the inner turn connector 19 may pass.

Let us assume that the coil 17 is the first coil to be wound, and thus it will be apparent that with a continuous conductor being employed, there will be plenty of room on the remainder of the cylinder 22 to wind the coil 20 from the inside out and then reshuffle it so that it will progress from the outside in as is illustrated in Fig. 2. The coil 20 may then be pulled tight and pushed tightly against the coil 17 as is illustrated in Fig. 1. Another channel 30 similar to 23 may then be placed on the cylinder 22 and the end 21 passed through the slit 28 so that a turn similar to the disk coil 17 may be wound in the collar 30. The collars 23 and 30 may have sufficient resiliency so that the conductor may be slipped into the slit 28 by merely pulling the collar until the ends part at the overlapping portion 24.

In order to provide an improved arrangement for spacing the disk windings 15 and 16, I provide an improved spacer arrangement 31 which is illustrated in detail in Fig. 5. Any suitable number of spacers may be provided around the outside periphery of the windings 15 and 16 so as to suitably space the windings from each other and so as to provide ducts 32 (see Fig. 1) and to space the winding 16 from an insulating cylinder 33 upon which is placed any suitable type of electrostatic shield 34. Each of the spacers includes a column portion 35 composed of any suitable material, such as a laminated cellulosic material and a second portion 36 which is bent around three faces of the column. The portion 36 is provided with any suitable number of grooves 37 which are suitably spaced so that the adjacent ends of the portions 26 and 27 of the flange collars may fit into the grooves 37, as will be seen in Fig. 4. By employing suitable grooves in the spacers which cooperate with the channel members a relatively rigid coil construction is provided so as to minimize the possibility of movement of the coils and spacers during operation of the transformer. It will also be seen in Fig. 4 which shows an enlarged view of the winding that each of the coils 17 and 20 is formed by a conductor of three strands so that each turn includes three parallel strands 38, 39 and 40.

It will be seen that if the grooves are cut directly into the column portion 35 of a laminated cellulosic material, that sections or pieces between the grooves will be left which may become loose during operation of the transformer. Such a condition may cause shifting of the spacers which would cause the ducts to clog up or allow the windings to move closer together, therefore providing a condition in which arc over or puncture of the insulation might take place. Also, pieces of material which come off the spacers will contaminate the insulating fluid and also clog up any pump equipment, if the fluid is being forced through the ducts. It will be seen, however, that by employing a portion 36 which is wrapped around the column 35 and by cutting the grooves 37 in the portion 36, that the possibility of pieces becoming loose is thereby minimized. Thus, portions 41 between the grooves, due to the configuration of the portion 36 are connected by a continuous or integral portion 42 so as to prevent breakup of any of the laminations which are cut by the grooves 37.

In view of the foregoing it will be seen that I have provided an improved winding structure for any suitable electric apparatus such as a transformer in which adjacent disk coils are insulated from each other by channel collars which surround every other disk coil. Furthermore, when a plurality of windings are employed, I provide an improved spacer construction which cooperates with the edges of the channels and spaces the windings.

Modifications of the particular arrangements which I have disclosed embodying my invention will occur to those skilled in the art, so that I do not desire my invention to be limited to the particular arrangements set forth and I intend in the appended claims to cover all modifications which do not depart from the spirit and scope of my invention.

What I claim as new and desire to secure by Letters Patent of the United States is:

1. In an electric apparatus, a plurality of concentric windings, channel collar members having an annular axially extending portion and radially extending portions, turns of said windings within said collar members, said radially extending portions of said collars extending beyond the outer surface of said turns within said collar, and spacers between said concentric windings to provide a fluid passage therebetween, said spacers having transversely extending grooves to receive the adjacent part of said collar portion which extends beyond the turn surface so as to relatively tightly hold said spacers between said concentric windings.

2. In an electric apparatus, a plurality of continuous disk coil windings, each of said windings including a plurality of axially disposed disk coils, each of said coils including a plurality of concentric turns, and a plurality of channel collars, every other coil being wound in a channel collar, said disk coil in each of said collars being wound from the inside out, said coils between said collars having turns so disposed that the intercoil conductor connects with the outside turn and the turns progressing inwardly, said channels having slits to receive the intercoil conductor connections from the inner turns of said coils between said collars and the inner turn of the next of said coils within said channels, and spacers between said windings to provide a fluid passage therebetween, said spacers having grooves to receive the adjacent part of said collar portion which extends beyond the turn surface so as to relatively tightly hold said spacers between said concentric windings.

3. In an electric apparatus, a plurality of concentric windings, channel collars, turns of the inner of said windings within said collars, said collars having portions extending beyond the outer surface of said turns, and spacers between said concentric windings to provide a fluid passage therebetween, said spacers having grooves to receive the adjacent part of said extending collar portions so as to relatively tightly hold said spacers between said concentric windings.

4. In an electric apparatus, a plurality of concentric windings, channel collars, turns of said windings within said collars, said collars having portions extending beyond the outer surface of said turns, and a plurality of axially extending spacers peripherally disposed around the inner of said windings between said concentric windings, said spacers having transversely extending grooves to receive the adjacent part of said extending collar portions so as to relatively tightly hold said spacers between said concentric windings.

5. In an electric apparatus, a plurality of concentric windings, channel collars, turns of the inner of said windings within said collars, said collars having portions extending beyond the outer surface of said turns, and spacers between said concentric windings to provide a fluid passage therebetween, said spacers including a column portion and a laminated portion covering at least two sides of said column portion, said laminated portion having grooves on one side to receive the adjacent part of said extending collar portions.

KONSTANTIN K. PALUEV.